(12) United States Patent
Ehrman et al.

(10) Patent No.: US 7,842,200 B2
(45) Date of Patent: Nov. 30, 2010

(54) SOLID OXIDE FUEL CELL (SOFC) ANODE MATERIALS

(75) Inventors: Sheryl Heather Ehrman, Washington, DC (US); Ranjan Kumar Pati, Greenbelt, MD (US); Osifo Akhuemonkhan, Laurel, MD (US)

(73) Assignee: University of Maryland, College Park, College Park, MD (US)

( * ) Notice: Subject to any disclaimer, the term of this patent is extended or adjusted under 35 U.S.C. 154(b) by 0 days.

(21) Appl. No.: 11/755,014

(22) Filed: May 30, 2007

(65) Prior Publication Data

US 2008/0087869 A1 Apr. 17, 2008

Related U.S. Application Data

(60) Provisional application No. 60/803,416, filed on May 30, 2006.

(51) Int. Cl.
*H01B 1/08* (2006.01)
*H01M 8/10* (2006.01)
*C01G 25/02* (2006.01)

(52) U.S. Cl. ............... 252/520.21; 252/520.5; 423/85

(58) Field of Classification Search .............. 252/518.1, 252/520.2, 520.5, 512; 977/776, 811; 429/30, 429/33; 423/71, 85
See application file for complete search history.

(56) References Cited

U.S. PATENT DOCUMENTS

| | | |
|---|---|---|
| 5,261,944 A | 11/1993 | Lockhart et al. |
| 5,358,695 A | 10/1994 | Helble et al. |
| 5,958,361 A | 9/1999 | Laine et al. |
| 5,993,511 A | 11/1999 | Piro et al. |
| 6,165,553 A | 12/2000 | Chen et al. |
| 6,379,417 B2 | 4/2002 | Piro et al. |
| 6,589,680 B1 | 7/2003 | Gorte et al. |
| 6,613,300 B2 | 9/2003 | Mangold et al. |
| 6,656,588 B1 | 12/2003 | Laine et al. |
| 6,803,141 B2 | 10/2004 | Pham et al. |
| 6,844,099 B1 | 1/2005 | Gorte et al. |

(Continued)

FOREIGN PATENT DOCUMENTS

WO WO03052847 6/2003

(Continued)

OTHER PUBLICATIONS

Ringuede et al "A combustion synthesis method to obtain alternative cermet materials for SOFC anodes", Solid State Ionics 141-142 (2001) 549-557.*

(Continued)

*Primary Examiner*—Mark Kopec
(74) *Attorney, Agent, or Firm*—Jeffrey I. Auerbach; Edell, Shapiro & Finnan, LLC

(57) ABSTRACT

The invention relates to compositions and composite particles that may be employed as anode materials for Solid Oxide Fuel Cells (SOFCs). The invention particularly relates to novel metallic SOFC anode materials, which preferably comprise metallic nickel (Ni), copper (Cu), especially if the Ni/Cu oxide has been stabilized with yttrium (Y) oxide (e.g., $Y_2O_3$) and/or zirconium (Zr) oxide (e.g., $ZrO_2$) composition(s) ("YSZ"). Such compositions may additionally comprise a cerium (Ce) oxide (such as $CeO_2$) (e.g., Ni/YSZ/$CeO_2$). The invention particularly concerns such compositions and particles produced through the use of direct deposition or Flame Spray Pyrolysis so as to provide a controlled morphology and chemical composition.

14 Claims, 7 Drawing Sheets

Ni/YSZ

U.S. PATENT DOCUMENTS

| | | | |
|---|---|---|---|
| 6,902,745 B2 | 6/2005 | Lee et al. | |
| 6,911,889 B2 | 6/2005 | Bodley | |
| 6,958,196 B2 | 10/2005 | Gorte et al. | |
| 6,982,073 B2 | 1/2006 | Sabacky et al. | |
| 7,014,942 B2 | 3/2006 | Gorte et al. | |
| 7,211,236 B2 | 5/2007 | Stark et al. | |
| 2004/0096718 A1 | 5/2004 | Gomez | |
| 2006/0000903 A1 | 1/2006 | Barry | |
| 2006/0090317 A1 | 5/2006 | Wang | |
| 2006/0127747 A1* | 6/2006 | Arico et al. | 429/44 |
| 2007/0117006 A1* | 5/2007 | Zhan et al. | 429/45 |
| 2008/0070084 A1* | 3/2008 | Ishihara et al. | 429/33 |

FOREIGN PATENT DOCUMENTS

| | | |
|---|---|---|
| WO | WO2004024796 | 3/2004 |

OTHER PUBLICATIONS

Sunagawa et al "Improvement of SOFC Anode Performance by Finely-Structured Ni/YSZ Cermet Prepared via Heterocoagulation", J. Phys. Chem. B 2006, 110, 6224-6228.*

Esposito et al "New Chemical Routes for Preparation of Ultrafine Ni—YSZ Powders for SOFC Anode Applications", Electrochem Soc Proc vol. 2003-07 (Solid Oxide Fuel Cells VIII), 643-52 (no month).*

Qin, X. et al. (2005) "Synthesis of $Y_2O_3$:Eu Phosphor Nanoparticles by Flame Spray Pyrolysis," NSTI-Nanotech, vol. 2:9-12.

Kim, T. et al. (2002) "Internal Carbon Dioxide Reforming by Methane Over Ni—YSZ—$CeO_2$ Catalyst Electrode in Electrochemical Cell", Appl. Catalysis A—General 224: 111-120.

Nakagawa, N. et al. (2001) "Catalytic Activity of Ni—YSZ—$CeO_2$ Anode for the Steam Reforming of Methane in a Direct Internal-Reforming Solid Oxide Fuel Cell", J. Power Sources 92: 88-94.

Fukui, T. et al. (1998) "Long-term Stability of Ni—YSZ Anode with a New Microstructure Prepared from Composite Powder", Electrochem. Solid State Lett. 1: 120-22.

Minh, N.Q. (1993) "Ceramic Fuel Cells," J. Amer. Ceram. Soc. 76:563-588.

Dees, D.W. et al. (1987) "Conductivity of Porous Ni/$ZrO_2$—$Y_2O_3$ Cermets", Solid State Ionics, 134:2141-2146.

Goldhirsch, I. et al. (1983) ("Theory Of Thermophoresis. I. General Considerations And Mode-Coupling Analysis," Physical Review A (General Physics) 27(3):1616-1634.

Talbot, L. et al. (1990) ("Thermophoresis Of Particles In A Heated Boundary Layer," J. Fluid Mech. Digital Arch. 101:737-758.

Chiou, M.C. (1998) ("Effect Of Thermophoresis On Submicron Particle Deposition From A Forced Laminar Boundary Layer Flow Onto An Isothermal Moving Plate," J. Acta Mechanica 129(3-4):219-229.

Blackwell, C. et al. (2006) ("The Influence of Thermophoresis Effects During Deposition of Hydrogenated AmorphousSilicon Thin Films with Nanocrystalline Silicon Inclusions," In: Amorphous and Polycrystallinethin-Film Silicon Science and Technology—2006, H.A. Atwater, Jr. et al. (Eds.) (Mater. Res. Soc. Symp. Proc. 910, Warrendale, PA.

Kammler, H.K. et al. (2001) "Flame Synthesis Of Nanoparticles," Chem. Eng. Technol., 24 (6), 583-596 (2001).

Mädler, L. et al. (2002) "Controlled Synthesis Of Nanostructured Particles By Flame Spray Pyrolysis," J. Aerosol Sci., 33 (2), 369-389 (2002).

Mädler, L. et al. (2002) "Flame-Made Ceria Nanoparticles", J. Mater. Res., 17 (6), 1356-1362.

Pratsinis, S.E. (1998) "Flame Aerosol Synthesis of Ceramic Powders," Progr. Energy Combust. Sci. 24:197-219.

* cited by examiner

Ni/YSZ

Electrochemical performance (I-V relationship) of Ni/YSZ anode materials

Sample 1: $(NiO)_{0.25}(YSZ)_{0.75}$
Sample 2: $(NiO)_{0.50}(YSZ)_{0.50}$
Sample 3: $(NiO)_{0.75}(YSZ)_{0.25}$ Ni/CeO$_2$/YSZ Electrochemical performance (I-V relationship) of $NiO/CeO_2/YSZ$ anode materials Sample 1: $(NiO)_{0.3}(CeO_2)_{0.3}(YSZ)_{0.4}$
Sample 2: $(NiO)_{0.3}(CeO_2)_{0.2}(YSZ)_{0.5}$
Sample 3: $(NiO)_{0.3}(CeO_2)_{0.1}(YSZ)_{0.6}$
Sample 4: $(NiO)_{0.2}(CeO_2)_{0.3}(YSZ)_{0.5}$ Cu/YSZ Electrochemical performance (I-V relationship) of CuO/YSZ anode materials Sample 1: $(CuO)_{0.25}(YSZ)_{0.75}$
Sample 2: $(CuO)_{0.50}(YSZ)_{0.50}$
Sample 3: $(CuO)_{0.75}(YSZ)_{025}$

SOLID OXIDE FUEL CELL (SOFC) ANODE MATERIALS

CROSS-REFERENCE TO RELATED PATENT APPLICATIONS

This application claims priority to U.S. Patent Application Ser. No. 60/803,416, filed on May 30, 2006, which application is herein incorporated by reference in its entirety.

FIELD OF THE INVENTION

The present invention relates to compositions and composite particles that may be employed as anode materials for Solid Oxide Fuel Cells (SOFCs). In preferred embodiments, the compositions and composite particles comprise Ni/YSZ, Cu/YSZ, and Ni/YSZ/CeO$_2$ materials. The present invention particularly concerns such compositions and particles produced through the use of direct deposition or Flame Spray Pyrolysis so as to provide a controlled morphology and chemical composition.

BACKGROUND OF THE INVENTION

A fuel cell is an electrochemical cell that converts chemical energy directly into electrical energy through a chemical reaction between an electrolyte, a fuel, and an oxidizer. Fuel cells thus differ from batteries in that they consume reactants, which must be replenished, while batteries merely store electrical energy chemically in a closed system. Additionally, while the electrodes within a battery react and change as a battery is charged or discharged, a fuel cell's electrodes are catalytic and relatively stable. The use of fuel cells is becoming of ever-greater interest as a potentially cleaner and more efficient manner of producing electrical energy relative to combustion-based power generation processes and systems. Two forms of fuel cells presently predominate development activities: Proton Exchange Membrane Fuel Cells (PEMFC) and Solid Oxide Fuel Cells (SOFCs).

Proton Exchange Membrane Fuel Cells (also known as Polymer Electrolyte Membrane Fuel Cells (PEMFCs) are discussed in US20060090317; US20040096718; WO03052847; and WO04024796. PEMFCs involve the use of a membrane to transform the chemical energy liberated during the electrochemical reaction of reactants (such as hydrogen and oxygen) to electrical rather than thermal energy. Technical constraints have limited the applicability of PEMFCs. The membrane must be capable of conducting hydrogen ions while being impermeable to electrons and gases. It must also be resistant to both the reducing environment at the cathode and the oxidative environment at the anode. The most commonly used membrane is Nafion® (DuPont), which relies on liquid water humidification of the membrane to transport protons. PEMFCs do not operate at temperatures above 80-90° C., and their efficiencies are presently only in the range of 40-60% Higher Heating Value of Hydrogen (HHV; defined as the amount of heat released by the combustion of a specified quantity of material (measured at initial and final temperatures of 25° C.)). Additionally, PEMFCs require expensive catalysts (such as platinum).

Solid Oxide Fuel Cells (SOFCs) are discussed in U.S. Pat. Nos. 7,211,236; 7,014,942; 6,982,073; 6,958,196; 6,902,745; 6,844,099; 6,803,141; 6,803,138; 6,656,588; 6,589,680; 6,379,417; 6,165,553; 5,993,511; 5,958,361; 5,358,695; and 5,261,944. U.S. Pat. No. 6,613,300 is considered of particular relevance to the present invention, and relates to doped, pyrogenically prepared oxides of metals and/or non-metals. U.S. Pat. No. 7,211,236 concerns methods of producing metal oxides by flame spray pyrolysis for use in SOFCs. U.S. Pat. Nos. 7,014,942; 6,844,099 and 6,589,680 concern methods for preparation of an anode for a solid oxide fuel cell in which a plurality of zircon fibers are mixed with a yttria-stabilized zirconia (YSZ) powder, forming a fiber/powder mixture; the fiber/powder mixture is formed into a porous YSZ layer, calcined and impregnated with a metal-containing salt solution. U.S. Pat. No. 6,982,073 and concerns the use of nano-sized stabilized zirconia in electrolytes of solid-state fuel cells. U.S. Pat. No. 6,958,196 relates to porous electrodes comprised primarily of ceramic material and electronically conductive material for use in solid oxide fuel cells. U.S. Pat. No. 6,902,745 relates to a method for producing nano-sized lithium-cobalt oxide using flame-spray pyrolysis. The use of AR, H, O$_2$/air, and air is disclosed. U.S. Pat. No. 6,803,141 describes ultra-high power density solid oxide fuel cells (SOFCs) which employs a buffer layer of doped-ceria, a zirconia electrolyte and a cobalt iron-based electrode. Micron thick layers are disclosed. U.S. Pat. No. 6,803,138 concerns processes for preparing aqueous suspensions of a nanoscale ceramic electrolyte material such as yttrium-stabilized zirconia. U.S. Pat. No. 6,656,588 discusses doped, nanosize metal oxide particles in a two oxide system in which a nano phosphorus powder and triethanolamine (TEA) are employed. U.S. Pat. Nos. 6,379,417; 5,993,511 and 5,261,944 concern nickel cermet anodic material for fuel cell anodes. U.S. Pat. No. 6,165,553 concerns methods of fabricating ceramic membranes. U.S. Pat. No. 5,958,361 relates to the use of flame spray pyrolysis to provide ultrafine metal oxide powders; glyoxylate polymetaloxane coatings are discussed. U.S. Pat. No. 5,358,695 discusses nanoscale ceramic particles.

SOFCs have utility in a wide range of power generation applications including residential, communications, commercial, industrial and military/security applications. SOFCs present a number of advantages compared to other types of fuel cells and existing power generation systems, such as (a) high-energy conversion efficiency (up to 40%-60%), (b) flexibility in fuel choice (natural gas, diesel, gasoline, liquid petroleum, biomass, etc.), (c) low levels of toxic emission (compared to conventional combustion electricity generation, carbon dioxide emissions are up to 60% lower and nitrogen oxides (NOx) and sulfuric oxides (SOx) can be minimized depending on the fuel input), (d) solid state device (SOFC technology has no moving parts or corrosive liquid electrolytes), (e) competitive production costs, and (f) broad product range capability. In contrast to PEMFCs, SOFCs are composed entirely of solid-state materials, typically ceramics. Since SOFCs do not employ water or membranes, they are capable of operating at much higher temperatures (e.g., 700-1,000° C.) than PEMFCs. The higher operating temperature of SOFC's eliminates the requirement for expensive catalysts, and permits SOFCs to be used with a variety of different fuels.

Typically, each fuel cell of an SOFC is composed of three layers: the cathode, the electrolyte and the anode. The cathode is the positive side of the cell (i.e., towards which electrons flow); its purpose is to use electrons to produce oxygen ions by reducing oxygen molecules in the air. As such, it must be an electrically conductive and air-porous material. The electrolyte is a dense, electrically insulating, gas-tight layer that separates the cathode from the anode, thereby requiring electrons resulting from the oxidation reaction on the anode side to travel through an external circuit before reaching the cathode side. The most important requirement of the electrolyte however is that it must be able to conduct oxygen ions from the cathode to the anode. It is common for the anode and cathode layers of such fuel cells to be connected in series using a metallic or ceramic layer (i.e., an anode "interconnect" and a cathode "interconnect").

The anode is the negative side of the cell (i.e., from which electrons flow); its function is to use the oxygen ions that diffuse through the electrolyte to oxidize the hydrogen fuel, thereby producing water and electrical energy. The SOFC anode is used for the electrochemical oxidation of fuels such as hydrogen and natural gas. To minimize polarization losses in the $H_2$ oxidation reaction, anode materials must exhibit high electronic conductivity, sufficient electrocatalytic activity for fuel oxidation reactions, chemically stability and thermal compatibility with other cell components and should have sufficient porosity for efficient gas transportation in high-temperature reducing environments.

In recent years, the Ni/YSZ (YSZ is $Y_2O_3$-stabilized $ZrO_2$) cermet anode has been shown to be very promising for use in SOFCs. However, stability at high temperatures (~1,000° C.) is required for long-term operation. In general, Ni grains in a Ni/YSZ cermet sinter easily at temperatures over 800° C., and this sintering leads to the degradation of the performance of the SOFC (Minh, N. Q. (1993) "*Ceramic Fuel Cells*," J. Amer. Ceram. Soc. 76:563-588; Dees, D. W. et al. (1987) "*Conductivity of Porous $Ni/ZrO_2$—$Y_2O_3$ Cermets*", Solid State Ionics, 134:2141-2146). To obtain Ni/YSZ cermet anodes that are stable at high temperatures, it is essential to prevent sintering of Ni grains in the anode. It has been reported that an anode structure in which fine YSZ grains are dispersed on the surface of Ni grains improved the stability of a Ni/YSZ cermet anode (Fukui, T. et al. (1998) "*Long-Term Stability of Ni-YSZ Anode With A New Microstructure Prepared From Composite Powder*", Electrochem. Solid State Lett. 1: 120-122). However, both high stability and high electrochemical activity are important for the Ni/YSZ cermet anode as the electrochemical activity strongly depends on a three-phase boundary (TPB) created among Ni grains, YSZ grains and pores. Thus, available anode materials are not fully satisfactory.

In sum, despite all prior advances, a need remains for improved SOFC anode materials. The present invention, which provides improved SOFC anode materials, and SOFCs which incorporate such anode materials, is directed to this and related needs.

SUMMARY OF THE INVENTION

The present invention relates to compositions and composite particles that may be employed as anode materials for Solid Oxide Fuel Cells (SOFCs). In preferred embodiments, the compositions and composite particles comprise Ni/YSZ, Cu/YSZ, and $Ni/YSZ/CeO_2$ materials. The present invention particularly concerns such compositions and particles produced through the use of direct deposition or Flame Spray Pyrolysis so as to provide a controlled morphology and chemical composition.

In detail, the invention provides an anode material for a solid oxide fuel cell, comprising a metal/YSZ composite, the composite containing a substantially uniform metal/YSZ powder composed of particles having a diameter of between 10 and 100 nm, wherein the metal of the composite and powder comprises Mn, Fe, Co, Ni or Cu.

The invention particularly concerns the embodiments of such an anode material wherein the metal of the composite comprises Ni or Cu, and/or wherein the composite additionally comprises Ce or an oxide thereof.

The invention also concerns an anode material for a solid oxide fuel cell, wherein the material is produced through a process which comprises:

subjecting droplets of an aqueous solution to heat, wherein the solution comprises:
(a) a salt of yttrium;
(b) a salt of zirconium; and
(c) a salt of Mn, Fe, Co, Ni or Cu;

under conditions sufficient to form a metal oxide/YSZ composite containing a substantially uniform metal oxide/YSZ powder composed of particles having a diameter of between 5 and 100 nm, wherein the metal oxide of the composite and powder comprises an oxide of Mn, Fe, Co, Ni or Cu.

The invention further concerns the embodiment of such anode material wherein the process additionally includes reducing the metal oxide to form a metal/YSZ composite containing a substantially uniform metal/YSZ powder of particles.

The invention further concerns the embodiments of such anode material wherein the metal of the composite comprises Ni or Cu, and/or wherein the composite additionally comprises Ce or an oxide thereof.

The invention also concerns a process for producing an anode material for a solid oxide fuel cell, wherein the process comprises:

subjecting droplets of an aqueous solution to heat, wherein the solution comprises:
(a) a salt of yttrium;
(b) a salt of zirconium; and
(c) a salt of Mn, Fe, Co, Ni or Cu;

under conditions sufficient to form a metal oxide/YSZ composite containing a substantially uniform metal oxide/YSZ powder composed of particles having a diameter of between 5 and 100 nm, wherein the metal oxide of the composite and powder comprises an oxide of Mn, Fe, Co, Ni or Cu.

The invention further concerns the embodiment of such process wherein the process additionally includes reducing the metal oxide to form a metal/YSZ composite containing a substantially uniform metal/YSZ powder of particles.

The invention further concerns the embodiments of such processes wherein the metal of the composite comprises Ni or Cu, and/or wherein the composite additionally comprises Ce or an oxide thereof.

DESCRIPTION OF PREFERRED EMBODIMENTS OF THE INVENTION

Figure 1:
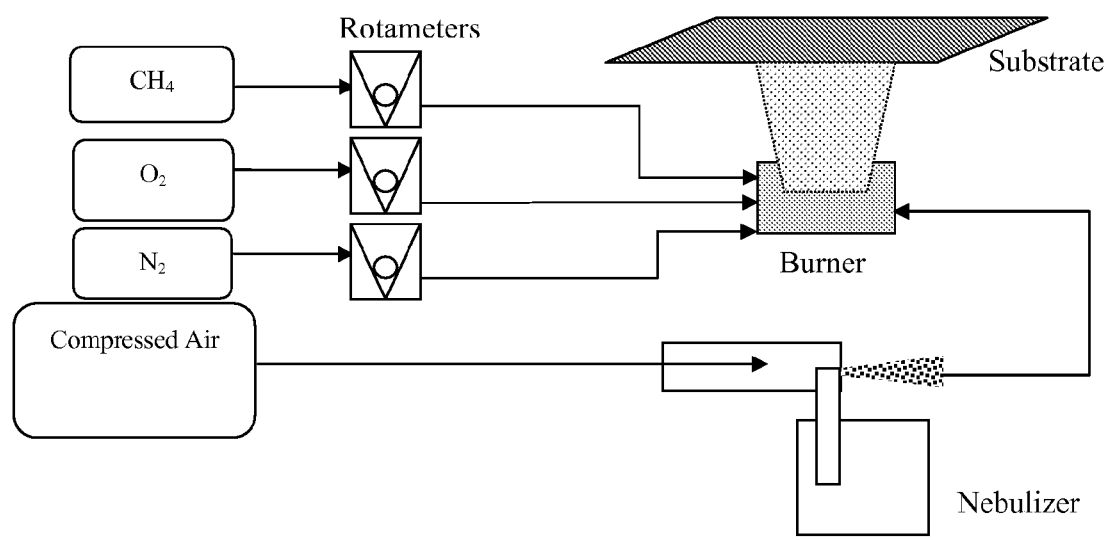
FIG. 1 shows a schematic representation of a preferred embodiment of the Flame Spray Pyrolysis apparatus of the present invention.

The present invention relates to compositions and composite particles that may be employed as anode materials for Solid Oxide Fuel Cells (SOFCs). The present invention particularly relates to novel metallic SOFC anode materials, which preferably comprise metallic nickel (Ni), copper (Cu). The invention thus particularly concerns Ni or Cu SOFC anode materials which are formed from a Ni or Cu oxide that has been stabilized with yttrium (Y) oxide (e.g., $Y_2O_3$) and/or zirconium (Zr) oxide (e.g., $ZrO_2$) composition(s) (hereinafter collectively referred to as "YSZ"). Thus, in preferred embodiments, the anode compositions and composite particles comprise Ni/YSZ and Cu/YSZ materials. In preferred embodiments, such compositions may additionally comprise a cerium (Ce) oxide (such as $CeO_2$) (e.g., Ni/YSZ/$CeO_2$). The present invention particularly concerns such compositions and particles produced through the use of direct deposition or Flame Spray Pyrolysis so as to provide a controlled morphology and chemical composition.

A further aspect of the present invention concerns the use of electrode layers having a thickness of less than 1.0 mm, more preferably, less than 500 µm, still more preferably less than 200 µm, still more preferably less than 100 µm, still more preferably less than 50 µm, and most preferably having a thickness of less than 20 µm, less than 10 µm, less than 5 µm or less than 1 µm. The invention particularly concerns the embodiment in which electrolyte layers of such thickness are employed in concert with the anode materials of the present invention.

Because of the requirements of operating in a strongly reducing environment and high electronic conductivity, pure porous metallic electrodes, in principle, can be used as anode materials. However, as discussed above, Ni alone tends to sinter. The present invention results, in part, from the recognition that such sintering can be minimized by mixing metallic nickel (Ni) or copper (Cu) with yttria-stabilized zirconia (YSZ), and thereby to produce a material with a thermal expansion coefficient closer to the thermal expansion coefficient of the solid YSZ electrolyte in the fuel cell.

Although in accordance with the present invention such anode compositions can be produced in any size or geometry, most preferably, the SOFC anode compositions of the present invention will be produced as layers formed from nano-sized powders. In one embodiment, such layers will be produced through direct deposition. In such an embodiment, layering is achieved through the transfer of particles of an anodic composition to: (A) an adjacently-positioned and contacting substrate and/or (B) a non-adjacently-positioned, non-contacting substrate which is separate from the source of the atoms by a gaseous, liquid or solid medium. Any means capable of mediating such migration (e.g., electrophoresis, photophoresis, thermophoresis, etc.) may be employed. Most preferably, such transference will be accomplished via thermophoresis and the particles will be from about 3 nm to about 100 nm in diameter, and more preferably, from about 5 to about 100 nm in diameter. Thermophoresis refers to a force exerted on particles where a temperature gradient is present, wherein the particles are driven by a thermophoretic "force" from a warmer region to a cooler region. Thus, in accord with the present invention, a substrate can be coated with particles by maintaining the surface at a lower temperature than the particles' source material. Thermophoresis is discussed in Goldhirsch, I. et al. (1983) ("*Theory Of Thermophoresis. I. General Considerations And Mode-Coupling Analysis*," Physical Review A (General Physics) 27(3):1616-1634); Talbot, L. et al. (1990) ("*Thermophoresis Of Particles In A Heated Boundary Layer*," J. Fluid Mech. Digital Arch. 101:737-758); Chiou, M. C. (1998) ("*Effect Of Thermophoresis On Submicron Particle Deposition From A Forced Laminar Boundary Layer Flow Onto An Isothermal Moving Plate*," J. Acta Mechanica 129(3-4):219-229); and Blackwell, C. et al. (2006) ("*The Influence of Thermophoresis Effects During Deposition of Hydrogenated Amorphous Silicon Thin Films with Nanocrystalline Silicon Inclusions*," In: AMORPHOUS AND POLYCRYSTALLINE THIN-FILM SILICON SCIENCE AND TECHNOLOGY-2006, H. A. Atwater, Jr. et al. (Eds.) (Mater. Res. Soc. Symp. Proc. 910, Warrendale, Pa.)).

In an alternate embodiment, flame spray pyrolysis (FSP) (also called liquid flame spray) may be employed to produce such layers. (see, for example, U.S. Pat. Nos. 7,211,236 and 5,958,361; Qin, X. et al. (2005) "*Synthesis of $Y_2O_3$:Eu Phosphor Nanoparticles by Flame Spray Pyrolysis*," NSTI-Nanotech, Vol. 2; Kammler, H. K. et al. (2001) "*Flame Synthesis Of Nanoparticles*," Chem. Eng. Technol., 24 (6), 583-596 (2001); Mädler, L. et al. (2002) "*Controlled Synthesis Of Nanostructured Particles By Flame Spray Pyrolysis*," J. Aerosol Sci., 33 (2), 369-389 (2002); Mädler, L. et al. (2002) "*Flame-Made Ceria Nanoparticles*", J. Mater. Res., 17 (6), 1356-1362). Flame pyrolysis refers to the formation of fine particles from gases in flames. Flame technology is employed routinely in large-scale manufacture of carbon blacks and ceramic commodities such as fumed silica and titania pigment powders and, to a lesser extent, for specialty chemicals such as zinc oxide and alumina powders (see, Pratsinis, S. E. (1998) "*Flame Aerosol Synthesis of Ceramic Powders*," Progr. Energy Combust. Sci. 24:197-219). Flame spray pyrolysis has the advantages of: (a) being a single step process, (b) able to produce ternary oxide compositions, with the concentration of components >20%, and uniform composition, small particle size and good electrochemical performance, and (c) providing improved cost economics for production of Ni/YSZ, over the other available processes (see, U.S. Pat. Nos. 7,014,942; 6,982,073; 6,958,196; 6,844,099; 6,589,680; 6,379,417; 6,16,5553; 6,613,300; 5,993,511; 5,358,695; 5,261,944).

Where flame spray pyrolysis is employed to make the SOFC anode materials of the present invention, it is preferred to employ a novel procedure in which an aqueous solution of metal salts (e.g., zirconyl nitrate, yttrium nitrate and nickel acetate), mixed at the atomic level, is used as a precursor to the final anode material. In such a procedure, the solution is nebulized, and the stream of droplets is mixed with combustion gases (e.g., methane, nitrogen, and oxygen) and introduced to a pre-mixed burner to form a powder. This powder is collected by thermophoresis onto a water-cooled surface. The resulting powder has excellent particle-to-particle composition uniformity, with very high surface area. The powders exhibit advantageous electrochemical activity for hydrogen oxidation (the key anode reaction for an SOFC). Composite particles formed through the use of such a preferred process are composed of a metal oxide mixed with fine crystalline YSZ grains. The metal oxide species reduces quickly to metal under the conditions of the hydrogen oxidation reaction, yielding a nanoscale metal/YSZ composite material. For example, where the metal is nickel, the process involves the nebulization of an aqueous solution of NiO, and the formation of a NiO powder mixed with fine crystalline YSZ grains. The NiO species is quickly reduced to metallic nickel under the conditions of the hydrogen oxidation reaction, thus forming the Ni/YSZ anode material of the present invention. Preferably layers of from about 10 μm to about 20 μm are formed.

The flame spray pyrolysis process of the present invention differs from prior processes in forming a nanoscale metal/YSZ composite material from a mixture of metal salt precursors in aqueous solution. The process of the present invention results in a material that is highly pure, crystalline, nanoscale, and catalytically active so that the "as prepared" materials can be used as anode materials. The process permits a single oxide system to be prepared, and further calcination is not required. A carbohydrate carrier is not required for combustion. In contrast, U.S. Pat. No. 6,613,300 discloses a flame spray pyrolysis process in which nanoscale doped, pyrogenic oxides are produced by a flame aerosol process. In that process, an aerosol is homogeneously mixed with the gas mixture for flame oxidation or flame hydrolysis prior to reaction. The aerosol/gas mixture is allowed to react in the flame resulting in doped pyrogenic oxide powders. U.S. Pat. No. 6,613,300 reports that two component oxide systems are prepared, even though it is a one step process. U.S. Pat. No. 5,358,695 describes the preparation of nanoscale multi component oxide materials by flame spray pyrolysis method. However, in the method of U.S. Pat. No. 5,358,695, a carbohydrate carrier (sucrose) is used for combustion. As prepared, the residual carbonaceous material needs further calcination for removal. U.S. Pat. No. 6,982,073 describes the preparation of nano-sized stabilized zirconia by spray drying process, where an intermediate is formed, which needs to be calcined to form nano-sized agglomerated particles. U.S. Pat. No. 6,165,553 describes a non-aerosol process, in which a dense membrane (mean particle diameter of approximately 50 μm) is produced from a colloidal suspension of a ceramic powder, and a polymeric precursor; additional heat treatment is needed to obtain the final product. U.S. Pat. Nos. 6,958,196; 6,844,099 and 6,589,680 describe the preparation of various electrode materials including Ni/YSZ cermet using non-aerosol methods. In such methods, a mixture of zircon fiber or other porous fiber is mixed with YSZ powder to form porous fiber/powder mixture and calcined. Then the porous YSZ layer is impregnated with a transition metal salt (Ni, Cu) solution having at least 35% by weight metal and further calcined. In this multi-step process, three component oxide systems are prepared with micron-sized particles. U.S. Pat. Nos. 6,379,417 and 5,993,511 describe a multi step process in which YSZ powder is mixed with a nickel nitrate solution. Excess water is evaporated from the mixture followed by calcinations to yield Ni/YSZ. In this process micron size particles are formed. U.S. Pat. No. 5,261,944 describes a process for producing Ni/YSZ particles which uses metal salts with amino acid/organic hydroxy acid/polyacrylic acid. This process is also a multi step process resulting in micron-sized particles. In sum, previously reported processes involve the preparation of oxide materials in a multi step process, using starting materials that are in the form of colloidal suspension (or metal ion with polymeric precursors or organic acids). The intermediate carbonaceous materials, which are amorphous and impure, are sometimes amorphous, and need further calcination to obtain crystalline phase material.

The flame spray pyrolysis method of the present invention produces uniformly mixed ternary oxides (3 or more components, with concentrations of components >20%), without addition of any combustion enhancing materials. In addition, the process of the present invention, which comprises forming an aqueous metal precursor solution, atomizing the mixture, and exposing it to a reaction environment with sufficiently high temperatures to cause the material to oxidize and form nanometer-sized particles, provides the improvement of being a single step process. In this process these materials do not need further annealing. The resulting particles are highly pure, nano-sized, crystalline, of uniform composition and electrochemically and catalytically active for use as an anode material in a solid oxide fuel cell.

Although the process and its resulting composition has been described with respect to preferred metals nickel and copper, other metals, such as manganese (Mn), iron (Fe) or cobalt (Co) may be employed (see, e.g., U.S. Pat. No. 7,014,942). However, these metals or their oxides do not provide sufficient electronic conductivity. Substitution of Ni by Cu would also be promising because CuO melts (melting temperature of CuO is 1326° C.) at the calcination temperatures of 1400° C., which is necessary for establishing the YSZ matrix in the anodes. Note, this is well above the SOFC operating temperature, and thus there is no concern regarding sintering of Cu. Another advantage of the use of Cu in place of Ni is the possibility of oxidizing hydrocarbons (CxHy) and other carbonaceous fuels (CxHyOz), such as methanol, ethanol, propanol and propanol directly. It is also reported that addition of $CeO_2$ to Ni/YSZ increases the power generation efficiency (Nakagawa, N. et al. (2001) "*Catalytic Activity of Ni-YSZ-CeO$_2$ anode For The Steam Reforming Of Methane In A Direct Internal-Reforming Solid Oxide Fuel Cell*", J. Power Sources 92:88-94). Carbon deposition occurs on the anode during steam reformation (Nakagawa, N. et al. (2001) "*Catalytic Activity of Ni-YSZ-CeO$_2$ anode For The Steam Reforming Of Methane In A Direct Internal-Reforming Solid Oxide Fuel Cell*", J. Power Sources 92:88-94), and this may cause blocking of the pores in the porous electrode. Addition of $CeO_2$ to the Ni/YSZ cermet may prevent carbon deposition, as electrochemically produced oxygen ions react with the surface carbon to produce carbon monoxide (Kim, T. et al. (2002) "*Internal Carbon Dioxide Reforming By Methane Over Ni-YSZ-CeO$_2$ Catalyst Electrode In Electrochemical Cell*", Appl. Catal. A-General 224:111-120).

In the present invention NiO/YSZ is preferably obtained in the form of composite oxide material in which doping component yttrium (Y) is present at approximately 8 mol %, and the doping component is a metal oxide. A second dopant, NiO, is present at between approximately 25 mol % to approximately 75 mol %. The surface area of the material is in the range of 20 m$^2$/g.

Thus, although the present invention preferably involves Cu/YSZ, Ni/YSZ or Ni/YSZ/CeO$_2$, the use of other metals is specifically contemplated. In this regard, a single metal species (e.g., Ni or Cu) may be employed (so as to produce compositions such as Ni/YSZ; Cu/YSZ; Fe/YSZ; Mn/YSZ; Co/YSZ; etc.), or mixtures or combinations (being of equal or unequal proportions) of two or more such metals may be employed (so as to produce compositions such as: [Ni/Cu]/YSZ; [Mn/Fe]/YSZ; [Mn/Co]/YSZ; [Mn/Ni]/YSZ; [Mn/Cu]/YSZ; [Fe/Co]/YSZ; [Fe/Ni]/YSZ; [Fe/Cu]/YSZ; [Co/Ni]/YSZ; [Co/Cu]/YSZ; [Mn/Fe/Co]/YSZ; [Mn/Fe/Ni]/YSZ; [Mn/Fe/Cu]/YSZ; [Fe/Co/Ni]/YSZ; [Fe/Co/Cu]/YSZ; [Mn/Co/Cu]/YSZ; [Mn/Co/Ni]/YSZ; [Fe/Ni/Cu]/YSZ; [Co/Ni/Cu]/YSZ; [Mn/Ni/Cu]/YSZ; [Mn/Fe/Co/Ni]/YSZ; [Mn/Fe/Co/Cu]/YSZ; [Mn/Fe/Ni/Cu]/YSZ; [Mn/Co/Ni/Cu]/YSZ; [Fe/Co/Ni/Cu]/YSZ; [Mn/Fe/Co/Ni/Cu]/YSZ; etc.).

The SOFCs of the present invention may have any of a variety of different geometries, such as a planar (e.g., sandwich-type) geometry, a tubular (e.g., cylindrical-type) geometry, an open or closed polygonal (e.g., pyramidical, icosohedral, spherical, etc.) geometry, etc. Such cells will preferably be multilamellar, composed of multiple sets of anode, cathode and electrolyte layers, so as to associate, for example, hundreds, thousands, or more, individual fuel cells in series to form the preferred SOFCs of the present invention.

Having now generally described the invention, the same will be more readily understood through reference to the following examples, which are provided by way of illustration and are not intended to be limiting of the present invention unless specified.

Example 1

Flame Spray Pyrolysis Process

A preferred embodiment of the Flame Spray Pyrolysis apparatus of the present invention is shown schematically in FIG. 1. In the figure, the apparatus comprises a pneumatic nebulizer that converts the starting solution to droplets, carrier and flame gases, flame reactor, heat exchanger, and substrate for powder collection. The fuel (shown as methane)/oxygen/nitrogen flame provides a radical rich environment for reaction of precursors, with flame temperatures ranging from 1,200° C. to 1,600° C.

Example 2

Preparation of NiO/YSZ Particles

The precursors used were nickel acetate, copper acetate, cerium acetate, yttrium nitrate and zyrconyl oxynitrate as the nickel, copper, cerium, yttrium, and zirconium source respectively. The precursors were dissolved in deionized water to make 0.5 M solutions of each. There are three different Ni/YSZ with Ni:YSZ mole ratios of 25:75, 50:50 and 75:25, eight different Ni/CeO$_2$/YSZ, samples with Ni:CeO$_2$:YSZ mole ratio of 30:30:40; 30:20:50; 30:10:60; 20:30:50, 30:40:30; 40:10:50; and 50:10:40; and three different Cu/YSZ with Cu:YSZ mole ratios of 25:75; 50:50; and 75:25 have been made keeping the Y to Zr mole ratio of 8:92. The solutions were filtered through a membrane filter before placing them in the nebulizer. In the nebulizer, the solutions were atomized with compressed air, having a flow rate of 4.0 l/min, resulting in a fine spray with a droplet mass median diameter in the range of 5.1 μm with geometric standard deviation of 2.0 and fed into the flame reactor. The flow rate of the liquid precursor solution into the flame was 0.5 ml/min. In the reactor, the premixed flame was made by combining methane, oxygen and nitrogen. The total flow rates for each gas including the contributions from the air used to atomize the precursor were methane 0.9 l/min, oxygen 2.6 l/min and nitrogen 5.9 l/min. The flows of all gases were controlled by rotameters. The burner itself was an adjustable width slit geometry with a 19.5 cm long slit. The slit width used in these experiments was 0.3 cm. The maximum temperature of the flame using these flow rates was approximately 1500° C. with a cooling rate of approximately 400° C./cm$^2$, which was measured using an S-type (Pt/10% Rh—Pt) thermocouple. The particles were collected by thermophoresis onto a water-cooled surface, which was positioned 2 cm above the top of the flame front and 6.5 cm above the top surface of the burner.

Bulk chemical composition is determined using atomic absorption spectroscopy (AAS). X-ray photoelectron spectroscopy (XPS) is used to investigate the surface segregation both at the precursor droplet drying state as well as during spray pyrolysis. XPS is also used to determine the oxidation state, and concentration of the atoms in the surface region. Dynamic light scattering (DLS) is used to investigate the size distribution of the particles in the final powders. Transmission electron microscopy (TEM) is used to determine the particle size and morphology of the materials and to qualitatively investigate the dispersion and crystallinity of the samples via selected area electron diffraction (SAED). High-resolution transmission electron microscopy (HRTEM) is used to look in detail at the nanostructure in the particles, to obtain the lattice parameters, and to compare the X-ray diffraction results. Thermogravimetric analysis (TGA) and Fourier transformed infrared (FTIR) spectroscopy are used to determine the minimum temperature needed to make the materials fully carbon free. FTIR is used to investigate the chemical bonding in the sample. Extended X-ray absorption fine structure (EXAFS) (located at Brookhaven National Laboratory) is used to determine the atomic number, distance and coordination number of the atoms surrounding the element whose absorption edge is being examined. An automatic physisorption analyzer is used to determine multi-point BET surface areas of the materials.

In order to evaluate the thermal stability of the composite materials, the "as prepared" samples are annealed in air at different temperatures starting from 600° C. to 1,000° C. (typical SOFC operation temperatures). These annealed particles are characterized by TEM to see any morphological change and by BET to measure the change in surface area.

Figure 2:
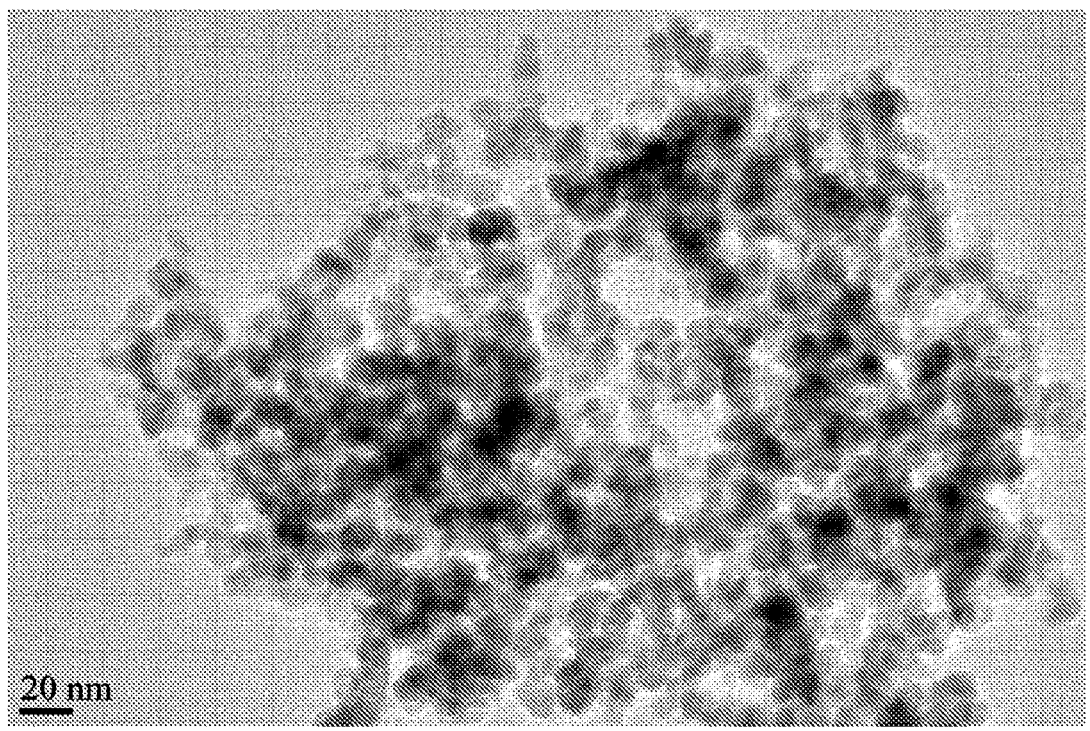
FIG. 2 shows a transmission electron microscope (TEM) image of NiO/YSZ particles prepared in accordance with an embodiment of the present invention.
Figure 3:
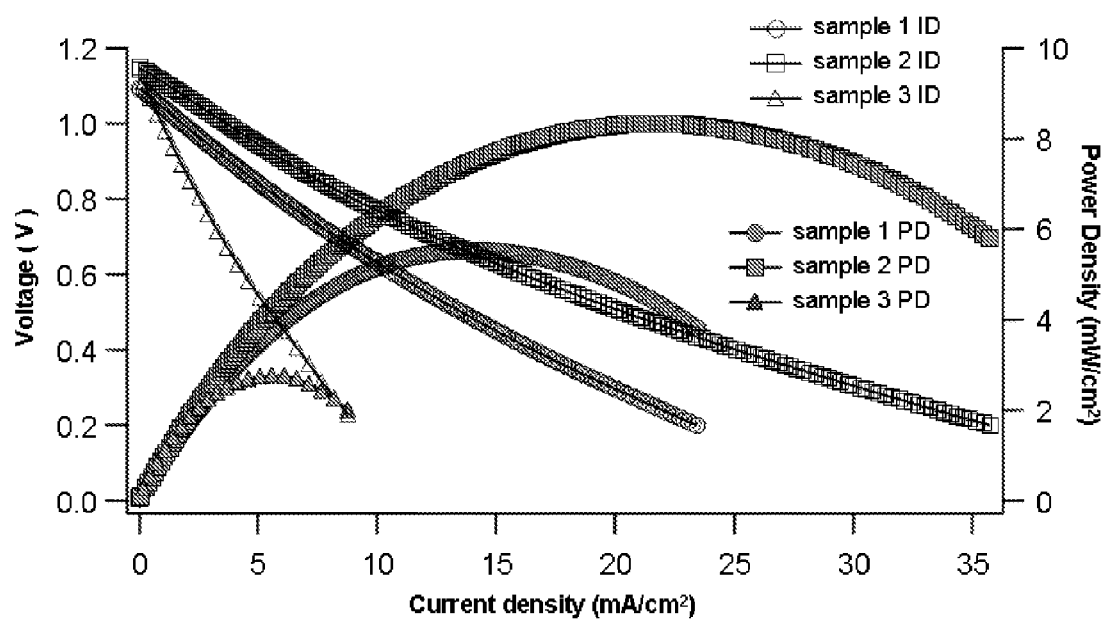
FIG. 3 shows the electrochemical performance (I-V relationship) of NIO/YSZ anode materials of the present invention (PD, power density; ID, current density).

NiO/YSZ particles were made in accordance with the methods of the present invention by reacting a mixture of aqueous metal precursor solution in methane oxygen flame. In the flame, the precursor vaporizes and reacts in the gas phase, forming the NiO/YSZ particles. X-ray photoelectron spectroscopy (XPS) results indicate that the Ni species is well mixed with the YSZ, rather than segregated on the surface or at the core of the particles. FIG. 2 shows a transmission electron microscope (TEM) image of the as prepared NiO/YSZ particles (with NiO:YSZ mole ratios of 50:50), and shows that the particles are agglomerated and have a particle diameter in the range of 10-15 nm with a surface area of 20 m$^2$/g. The electrochemical performance of all the materials shows that the materials are active (maximum power density of 8.3 mW/cm$^2$) towards hydrogen oxidation, and thus promising as an anode material. FIG. 3 shows the electrochemical performance (I-V relationship) of NiO/YSZ anode materials of the present invention.

Figure 4:
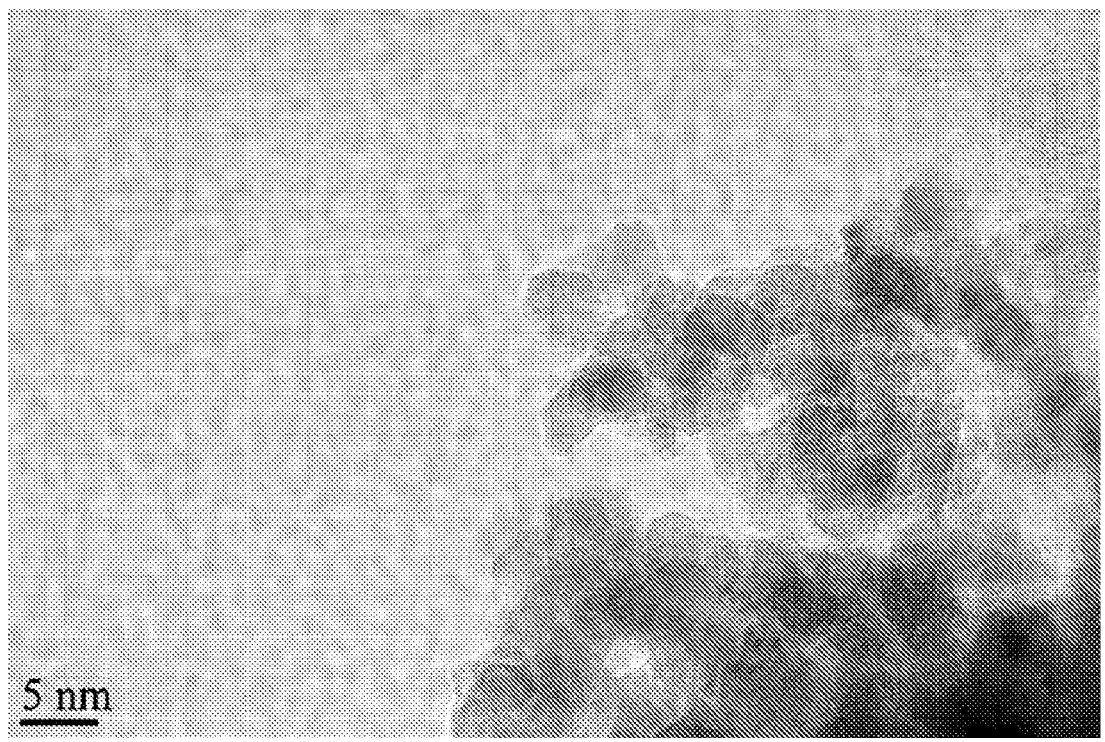
FIG. 4 shows a transmission electron microscope (TEM) image of $NiO/CeO_2/YSZ$ particles prepared in accordance with an embodiment of the present invention.
Figure 5:
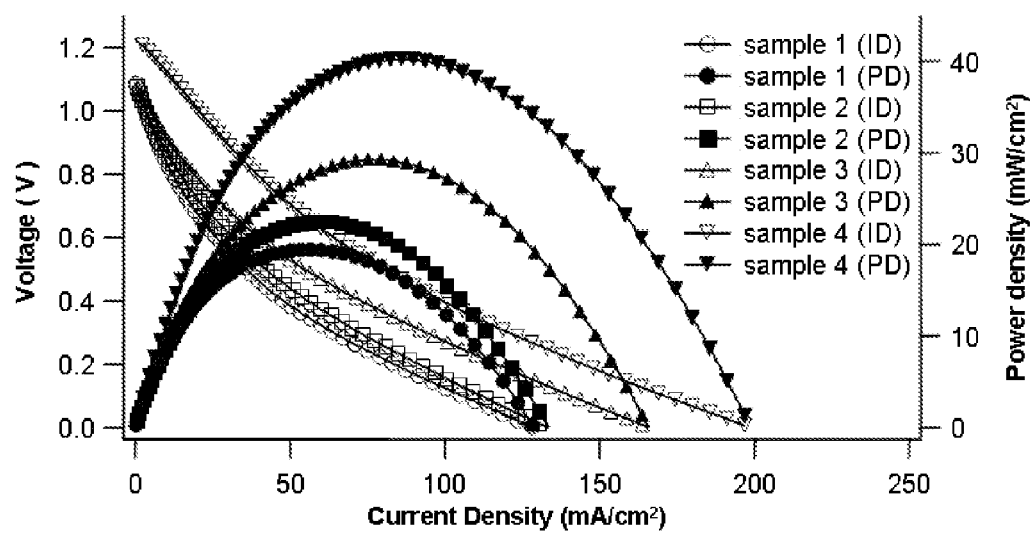
FIG. 5 shows the electrochemical performance (I-V relationship) of $NiO/CeO_2/YSZ$ anode materials of the present invention (PD, power density; ID, current density).

NiO/CeO$_2$/YSZ particles were made in accordance with the methods of the present invention by reacting a mixture of aqueous metal precursor solution in methane oxygen flame. In the flame, the precursor vaporizes and reacts in the gas phase, forming the NiO/CeO$_2$/YSZ particles. X-ray photoelectron spectroscopy (XPS) results indicate that the Ni species is well mixed with the YSZ, rather than segregated on the surface or at the core of the particles. FIG. 4 shows a transmission electron microscope (TEM) image of the as prepared NiO/CeO$_2$/YSZ particles (with NiO:CeO$_2$:YSZ mole ratios of 20:30:50), and shows that the particles are agglomerated and have a particle diameter in the range of 5-10 nm with a surface area of 80 m$^2$/g. The electrochemical performance of all the NiO/CeO$_2$/YSZ particles with different mole ratios shows that the materials are active (maximum power density of 40.2 mW/cm$^2$) towards hydrogen oxidation, and thus promising as an anode material. FIG. 5 shows the electrochemical performance (I-V relationship) of NiO/CeO$_2$/YSZ anode materials of the present invention.

Figure 6:
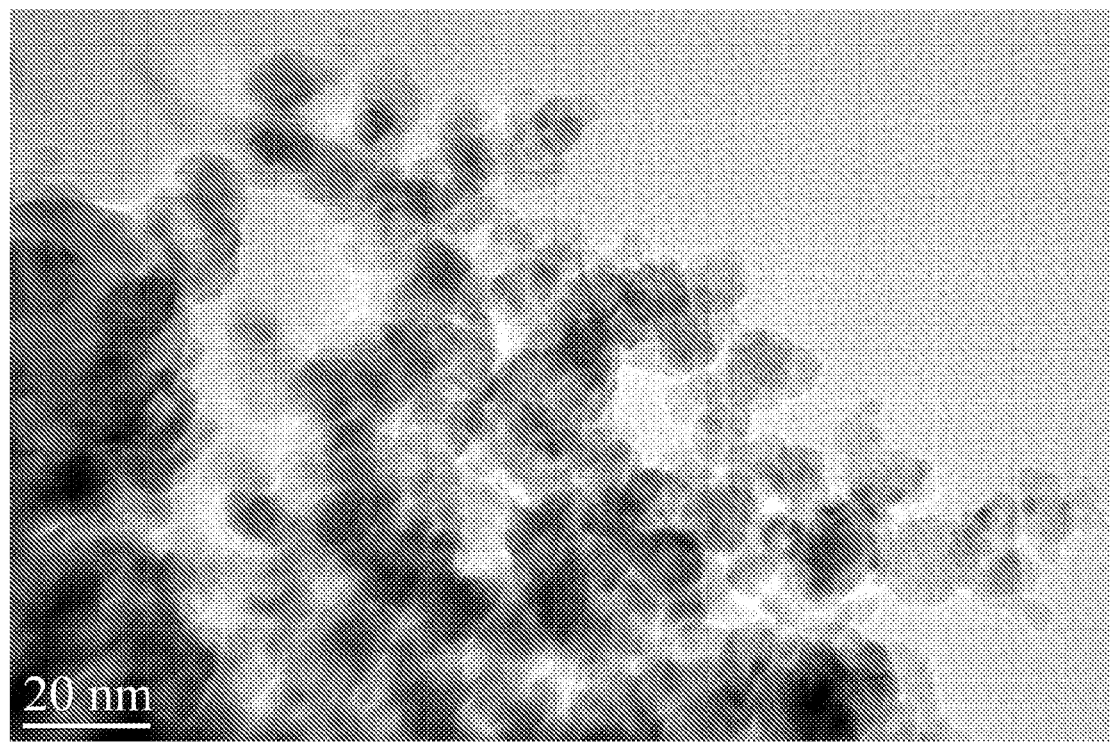
FIG. 6 shows a transmission electron microscope (TEM) image of CuO/YSZ particles prepared in accordance with an embodiment of the present invention.
Figure 7:
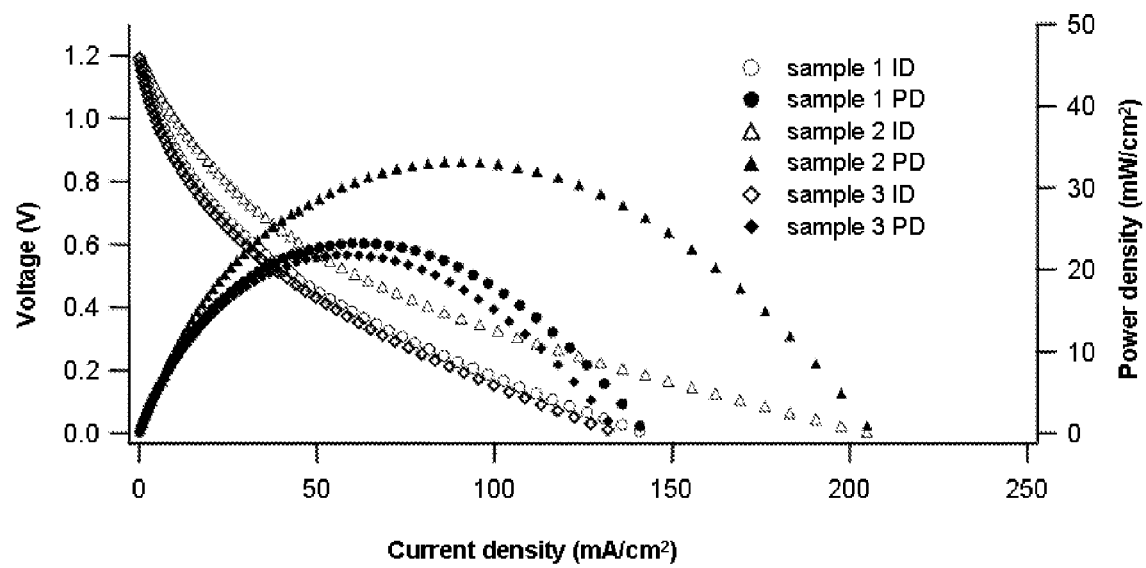
FIG. 7 shows the electrochemical performance (I-V relationship) of CuO/YSZ anode materials of the present invention (PD, power density; ID, current density).

CuO/YSZ particles were made in accordance with the methods of the present invention by reacting a mixture of aqueous metal precursor solution in methane oxygen flame. In the flame, the precursor vaporizes and reacts in the gas phase, forming the CuO/YSZ particles. X-ray photoelectron spectroscopy (XPS) results indicate that the Cu species is well mixed with the YSZ, rather than segregated on the surface or at the core of the particles. FIG. 6 shows a transmission electron microscope (TEM) image of the as prepared CuO/YSZ particles (with CuO:YSZ mole ratios of 50:50), and shows that the particles are agglomerated and have a particle diameter in the range of 5-15 nm with a surface area of 60 $m^2/g$. The electrochemical performance shows that the material is active (maximum power density of 33.2 $mW/cm^2$) towards hydrogen oxidation, and thus promising as an anode material. FIG. 7 shows the electrochemical performance (I-V relationship) of CuO/YSZ anode materials of the present invention.

All publications and patents mentioned in this specification are herein incorporated by reference to the same extent as if each individual publication or patent application was specifically and individually indicated to be incorporated by reference in its entirety. While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth.

What is claimed is:

1. A solid oxide fuel cell anode material, comprising a catalytically active metallic/YSZ, composite, said composite containing a substantially uniform metallic/YSZ powder composed of particles having a diameter of between 5 and 15 nm, wherein said metal of said composite and powder consists essentially of a first metal species component, said first metal species component consisting essentially of a single metal species or oxide thereof, said single metal species being either Ni or Cu, and optionally, one or more second metal species or oxide thereof, wherein when said first metal species is Ni, said second metal species is Mn or Ce, and when said first metal species is Cu, said second metal species is Mn, Fe, Co, or Ce.

2. The anode material of claim 1, wherein said single metal species is Ni.

3. The anode material of claim 1, wherein said single metal species is Cu.

4. The anode material of claim 3, wherein said composite additionally comprises Mn, Fe, Co, or Ce or an oxide of Mn, Fe, Co, or Ce.

5. A solid oxide fuel cell anode material, wherein said material comprises a catalytically active metallic/YSZ composite that is produced through a process which comprises: subjecting droplets of an aqueous solution to heat, wherein said solution comprises:

(a) a salt of yttrium;
(b) a salt of zirconium; and
(c) a salt of a single first metal oxide species, said first metal oxide species being either an oxide of Ni or an oxide of Cu and optionally, a second metal oxide species, wherein when said first metal oxide species is Ni, said second metal oxide species is an oxide of Mn or an oxide of Ce, and when said first metal oxide species is Cu, said second metal oxide species is in oxide of Mn, an oxide of Fe, an oxide of Co, or an oxide of Ce;

under conditions sufficient to form a metal oxide/YSZ composite containing a substantially uniform metal oxide/YSZ powder composed of particles having a diameter of between 5 and 15 nm, wherein said metal oxide of said composite and powder comprises an oxide of said first metal species.

6. The anode material of claim 5, wherein said process additionally includes reducing said first metal oxide to form a metal/YSZ composite containing a substantially uniform metal/YSZ powder of particles.

7. The anode material of claim 6, wherein said first metal species is Ni.

8. The anode material of claim 6, wherein said first metal species is Cu.

9. The anode material of claim 8, wherein said composite additionally comprises Mn, Fe, Co, or Ce, or an oxide of Mn, Fe, Co or Ce.

10. A process for producing a solid oxide fuel cell anode material, wherein said material comprises a catalytically active metallic/YSZ composite, wherein said process comprises: subjecting droplets of an aqueous solution to heat, wherein said solution comprises:

(a) a salt of yttrium;
(b) a salt of zirconium; and
(c) a salt of a single first metal oxide species, said first metal oxide species being either an oxide of Ni or an oxide of Cu and optionally, a second metal oxide species, wherein when said first metal oxide species is Ni, said second metal oxide species is an oxide of Mn or an oxide of Ce, and when said first metal oxide species is Cu, said second metal oxide species is an oxide of Mn, an oxide of Fe, an oxide of Co, or an oxide of Ce;

under conditions sufficient to form a metal oxide/YSZ composite containing a substantially uniform metal oxide/YSZ powder composed of particles having a diameter of between 5 and 15 nm, wherein said metal oxide of said composite and powder comprises an oxide of said first metal species, thereby producing said anode material.

11. The process of claim 10, wherein said process additionally includes reducing said metal oxide to form a metal/YSZ composite containing a substantially uniform metal/YSZ powder of particles.

12. The process of claim 11, wherein said single metal species is Ni.

13. The process of claim 11, wherein said single metal species is Cu.

14. The process of claim 13, wherein said composite additionally comprises Mn, Fe, Co or Ce, or an oxide of Mn, Fe, Co or Ce.

* * * * *

UNITED STATES PATENT AND TRADEMARK OFFICE
CERTIFICATE OF CORRECTION

PATENT NO. : 7,842,200 B2  Page 1 of 1
APPLICATION NO. : 11/755014
DATED : November 30, 2010
INVENTOR(S) : Sheryl Heather Ehrman It is certified that error appears in the above-identified patent and that said Letters Patent is hereby corrected as shown below:

Column 11, line 27, replace "catalytically active metallic/YSZ" with
-- catalytically active, crystalline metallic/YSZ --;

Column 11, line 47, replace "catalytically active metallic/YSZ" with
-- catalytically active, crystalline metallic/YSZ --;

Column 12, line 4, replace "is in oxide" with -- is an oxide --; and

Column 12, line 24, replace "active metallic/YSZ" with -- active, crystalline metallic/YSZ --.

Signed and Sealed this
Twenty-second Day of February, 2011

David J. Kappos
*Director of the United States Patent and Trademark Office*